July 17, 1956               K. VEIT               2,754,723
MOTION PICTURE PROJECTOR COMBINATION WITH
LAMP HOUSING AND AIR COOLING MEANS
Filed April 14, 1952
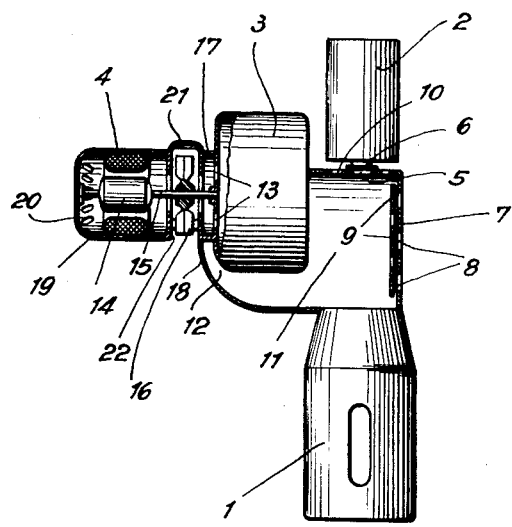
INVENTOR
Karl Veit
by
Stevens, Davis, Miller and Mosher
his attorneys

United States Patent Office 2,754,723
Patented July 17, 1956

2,754,723

MOTION PICTURE PROJECTOR COMBINATION WITH LAMP HOUSING AND AIR COOLING MEANS

Karl Veit, Esslingen, Germany, assignor to Eugen Bauer G. m. b. H., Stuttgart-Unterturkheim, Germany Application April 14, 1952, Serial No. 282,085

Claims priority, application Germany April 20, 1951

5 Claims. (Cl. 88—24)

The invention concerns a motion picture projector provided with a separately ventilated lamp house.

In motion picture projectors, the cooling of certain parts thereof plays an important part in the operation of the projectors. The main parts of the projector where the heat is to be dissipated are the lighting equipment, driving motor, gearing, parts with which the projectionist comes into contact and, apart from the film itself, the parts of the casing which are directly subjected to the heat radiated by the projector lamp or are in direct contact with the film. The effective cooling of the last mentioned parts, in particular, is essential for the safe operation of the motion picture projector, as it contributes largely towards reducing the risk of the film catching fire when the film is stationary. At the same time the ventilating or cooling means should be cheap to manufacture and easy to incorporate in the projector. In known arrangements, these conditions are only imperfectly accomplished, as they entail the use of either an arrangement of a plurality of ventilating wheels or the conduction of a stream of air past a number of successive points to be cooled so that the air stream cannot be sufficiently effective at each of these points.

These disadvantages are avoided, according to the present invention, by the provision of a cooling fan or blower driven by the motor of the motion picture projector and having a double-sided centrifugal impeller, one side whereof being adapted to draw a stream of air for cooling the film guide track and, if necessary, the driving mechanism, whilst at the same time the other side draws another cooling air stream through the motor casing, both cooling air streams being expelled by the double-sided centrifugal impeller directly to the exterior of the projector.

The term "double-sided centrifugal impeller" used above and in the following specification and claims means an impeller, such as a fan or fan wheel which is capable of drawing air on opposite sides thereof and of discharging it peripherally, i. e. in a centrifugal manner.

The invention is further described with reference to the accompanying diagrammatic drawing figure which illustrates in sectional plan view one embodiment of the invention by way of example.

The motion picture projector shown in the drawing consists principally of a lamp house 1, an optical objective 2 and a casing 3 for the mechanism, which casing is connected with the other casing parts of the projector and contains the usual gearing for conveying the film. Attached to casing 3 is a motor 4. A film window or gate 5 is disposed between the lamp house 1 and the objective 2, past which a film 6 is drawn downwardly through the projector. The film 6 is pressed against the film window 5 by means not shown on the drawing and touches the window with its edges. The rays from the lamp between the lamp house 1 and the film window 5 are shrouded by a casing 7 having apertures 8 which are masked by plates 9 to prevent leakage of light from casing 7. Corresponding apertures 10 are also provided near the film window 5. The interior 11 of the casing 7 is connected by a passage or duct 12 with the driving side of the casing 3 for the mechanism, which casing has apertures 13 which communicate with the passage 12.

The motor 4 has an armature 14 which actuates the mechanism (not shown) of the projector by means of a shaft 15. Mounted on this shaft is a double-sided centrifugal impeller 16. On its side facing the casing 3 the impeller 16 is enclosed by a casing 17 which is connected with a wall 18 of the passage 12 and covers the impeller 16 laterally with the exception of an axial inlet opening arranged around the shaft 15. On the other side of the impeller 16 the casing 19 of the motor 4 is so constructed that the impeller is also covered laterally with the exception of an inlet opening. Apertures 20 are formed in the end of the motor casing 19 remote from the impeller 16. The casings 17 and 19 are connected solely by separate cross pieces 21, so that the outer edge or periphery of the impeller 16 is in direct communication with the outer atmosphere through the annular opening 22 between the casings 17 and 19.

When the projector is in operation, the double-sided impeller 16 creates a vacuum near its axis with the result that a stream of air is drawn in from the passage 12 by the adjacent side of the impeller so that air enters the casing 11 through the apertures therein. This air stream maintains the casing 11, and particularly the film window 5 and the adjacent parts, so cool that even if the film is stationary it cannot become ignited thereby and at the same time the projectionist can manipulate the actuating handles and other parts to be handled without hesitation or discomfort.

Further air flows into the casing 3 for the driving mechanism in a manner not shown and through the apertures 13 to the impeller 16, so that the gearing is also cooled. At the same time the impeller 16 draws air through the casing 19 via the apertures 20 and expels all the air that has been drawn in through the annular opening 22 into the outer atmosphere. Since the distance travelled by the air is comparatively small, a strong air current is created. By appropriately relating the size and position of the apertures 8 and 10 it is possible to control the cooling effect as required. Moreover, by correct construction of the cross pieces 21 noiseless escape of the air can be obtained in a known manner.

I claim:

1. In combination with a motion picture projector which includes a lamp housing having an independent cooling means, a film guide track, a gear mechanism for moving a film in the guide track, a driving motor for such mechanism and a casing therefor; a cooling means for the motor and the guide track and gear mechanism comprising a double-sided centrifugal impeller disposed between the motor and the gear mechanism and having one of its sides facing the motor and the other facing the gear mechanism and the film guide track, said impeller having air intake means on one of its sides to draw a stream of air over and around the film guide track and the gear mechanism for cooling such parts and having air intake means on its opposite side for drawing a stream of air across the motor interiorally of the casing therefor, and said impeller having peripheral air exhaust means for expelling both streams of air separately and directly to the atmosphere.

2. In combination with a motion picture projector which includes a lamp housing having an independent cooling means, a film guide track, a gear mechanism for moving a film in the guide track, a driving motor for such mechanism and a casing therefor; a cooling means for the motor and the guide track and gear mechanism comprising a double-sided centrifugal impeller disposed between the motor and the gear mechanism and having one of its sides facing the motor and the other facing the gear mechanism and the film guide track, said impeller having an axial air flow path means on one of its sides to draw a stream of air only over and around the film guide track and the gear mechanism for cooling such parts and having an axial air flow path means on its opposite side for drawing a stream of air only across the motor interiorally of the casing therefor, and said impeller having peripheral air exhaust means for expelling both streams of air separately and directly to the atmosphere.

3. In combination with a motion picture projector which includes a main casing having a front, back and side walls, a lamp housing having an independent cooling means extending from the rear wall, a film guide track mounted on the front wall, a gear mechanism for moving a film in the guide track and disposed alongside the guide track at one of the side walls, a motor casing disposed alongside the gear mechanism and spaced exteriorly from the said side wall and a motor mounted in the motor casing and drivingly connected to the gear mechanism; an air cooling means for the motor and the guide track and gear mechanism comprising a double-sided impeller mounted between the inner end of the motor casing and the said side wall of the main casing, said other side wall of the main casing having air inlet openings and said first side wall of the main casing having an air outlet opening arranged axially of the impeller to form with the air inlet openings in the other side wall an air flow path to create a stream over and around the film guide track and the gear mechanism for cooling such parts, said motor casing having an outer end provided with air inlet means and an inner end disposed alongside one side of the impeller formed with an air outlet disposed axially of the impeller and creating an air flow path for a stream of air across the motor interiorally of the motor casing, and said impeller having peripheral air exhaust means for expelling both streams of air separately and directly to the atmosphere.

4. The combination of claim 3, wherein said motor has an armature shaft drivingly connected to the gear mechanism and on which the impeller is fixedly circumposed.

5. The combination of claim 3, wherein said first side wall of the main casing and the inner end of the motor casing form the sides of a housing for the impeller, said inner end of the motor casing and first side wall being connected by cross-pieces which form the open periphery of the housing for the impeller, such open periphery providing the air exhaust means for the impeller.

References Cited in the file of this patent
UNITED STATES PATENTS

| | | |
|---|---|---|
| 1,598,444 | Howell | Aug. 31, 1926 |
| 1,919,595 | Owens | July 25, 1933 |
| 1,966,531 | Tint | July 17, 1934 |
| 2,135,996 | Wood | Nov. 8, 1938 |
| 2,160,890 | Mulch | June 6, 1939 |
| 2,186,618 | Philips | Jan. 9, 1940 |
| 2,269,794 | Stechbart | Jan. 13, 1942 |
| 2,344,263 | Perkins | Mar. 14, 1944 |